United States Patent

[11] 3,571,521

[72] Inventors Eriberto Kleissl;
Pasquale Postorino, Milan, Italy

[21] Appl. No. 829,372
[22] Filed June 2, 1969
[45] Patented Mar. 16, 1971
[73] Assignee Societa Italiana Telecommunicazioni Siemens s.p.a.
[32] Priority June 3, 1968
[33] Italy
[31] 17279 A/68

[54] IMPEDANCE-MATCHING ARRANGEMENT FOR TELEPHONE CIRCUIT INCLUDING INPUT AND/OR OUTPUT AMPLIFIERS
10 Claims, 6 Drawing Figs.

[52] U.S. Cl. .......... 179/81
[51] Int. Cl. .......... H04m 1/60
[50] Field of Search .......... 179/81 (A), 81 (B), 16.5; 333/26, 32

[56] References Cited
UNITED STATES PATENTS

| | | | |
|---|---|---|---|
| 3,330,912 | 7/1967 | Koseki .......... | 179/81A |
| 3,350,510 | 10/1967 | Knauer et al. .......... | 179/81A |

*Primary Examiner*—Kathleen H. Claffy
*Assistant Examiner*—William A. Helvestine
*Attorney*—Karl F. Ross

ABSTRACT: Telephone system wherein a coupling circuit including a hybrid coil connects a receiver and a transmitter in conjugate relationship between a two-wire subscriber line and a balancing network, the receiver input and/or the transmitter output including an amplifier with a pair of line-side terminals bridged by a predominantly capacitive shunt. The sum of the effective receiver input and transmitter output impedances substantially equals the line impedance over a band of voice frequencies to be transmitted over the line, these two impedances being approximately equal if both conjugate branches have amplifiers.

E. Kleissl
P. Postorino
INVENTORS.

BY

Karl F. Ross
Attorney

Erberto Kleissl
Pasquale Postorino
INVENTORS.

BY

Karl F. Ross
Attorney

Erberto Kleissl
Pasquale Postorino
INVENTORS.

BY

Karl F. Ross
Attorney

Patented March 16, 1971 3,571,521

4 Sheets-Sheet 4

Erberto Kleissl
Pasquale Postorino
INVENTORS.

BY

Karl F. Ross
Attorney

IMPEDANCE-MATCHING ARRANGEMENT FOR TELEPHONE CIRCUIT INCLUDING INPUT AND/OR OUTPUT AMPLIFIERS

Our present invention relates to a telephone system wherein a two-wire line extends from a central office to a subscriber station which has a voice frequency transmitter, i.e. a mouthpiece, and a voice frequency receiver, i.e. an earpiece, connected in conjugate relationship between the line and an associated balancing network via the usual hybrid coil transformer.

For the well-known reasons of minimizing reflections and improving the efficiency of the system, it is desirable to terminate the subscriber line at its remote end (as seen from the central office) with a coupling circuit whose impedance matches the line impedance. In practice, however, this desideratum is difficult to achieve within an extended band of voice frequencies to be transmitted over the line, generally a band of several kHz., in which the resistive component of the circuit impedance increases slowly with frequency whereas the reactive component slowly decreases while remaining inductive in character, i.e. of positive sign; the line impedance, on the other hand, has a capacitive, i.e. negative, reactive component which decreases in absolute value with increasing frequency, this absolute value being substantially equal to that of the line resistance. With short subscriber lines, on the order of 100 meters or less, the line impedance is negligible compared to the impedance of the coupling circuit; with long lines, upward of about 2 kilometers, the line impedance predominates. Thus, as seen from the central office, the impedance of the subscriber channel varies greatly with the length of the line.

In our copending application Ser. No. 769,490 Hz., Oct. 22, 1968, we have disclosed a circuit arrangement including a passive network of at least partly capacitive supplemental impedance means, i.e. one or more condensers with or without a resistor or resistors in series or in parallel therewith, bridging all or part of the coupling circuit; this passive network, effectively shunting the line-side terminals of either or both of the two conjugate branches, respectively including the transmitter and the receiver, has a reactance which is negative in a predetermined region of the voice frequency band, generally a region starting at approximately 600—800 Hz., and attains a maximum absolute value at the upper limit of that region (more particularly around or slightly above 3,000 Hz.). The combined impedance of the coupling circuit and the supplemental passive network is then approximately equal to the characteristic impedance of the line.

The general object of our present invention is to provide impedance-matching means, similar to those of our copending application, in a telephone system whose transmitter and/or receiver are coupled to the line not directly but by way of an amplifier, as is frequently desirable.

We have found, in accordance with the present invention, that the aforestated object can be realized if the amplifier or amplifiers connected to the coupling network, inserted into either or both of the two conjugate branches referred to, are provided with respective reactive networks making the sum of the effective impedances of these branches (as seen from the line) substantially equal to the characteristic line impedance.

Thus, the aforesaid branch impedances are the output impedance of the transmitter amplifier (or of the mouthpiece itself if that amplifier is omitted) and the input impedance of the receiver amplifier (or of the earpiece if this amplifier is lacking); the effective magnitude of the latter impedance is the impedance measured across the primary winding of the hybrid coil transformer if the earpiece is energized (with or without amplification) from a secondary winding of that transformer.

If both conjugate branches of the subscriber station are provided with respective amplifiers, their respective impedances as seen from the line are preferably made substantially equal to each other so that each of these impedances corresponds to approximately one-half the characteristic line impedance. We have found that, especially with a two-amplifier arrangement of this description, our invention enables a very close matching of the line impedance by the combined transmitter and receiver impedance over virtually the entire voice frequency band.

In its broader aspects, the invention may be realized by the use of any conventional amplifier, with or without feedback, whose input or output impedance (depending on its insertion in either the receiving or the transmitting branch) has a reactive component of an absolute magnitude substantially equaling that of its resistive component throughout the transmitted band. In a preferred embodiment, the reactive network associated with the amplifier is connected across the line-side terminals of that amplifier and is of a predominately capacitive character, with one or more condensers alone or in combination with resistors in parallel or in series. Such a network may therefore have any of the configurations described in and disclosed in our aforementioned copending application.

The invention will be described in greater detail hereinafter with reference to the accompanying drawing in which.

Figure 2:
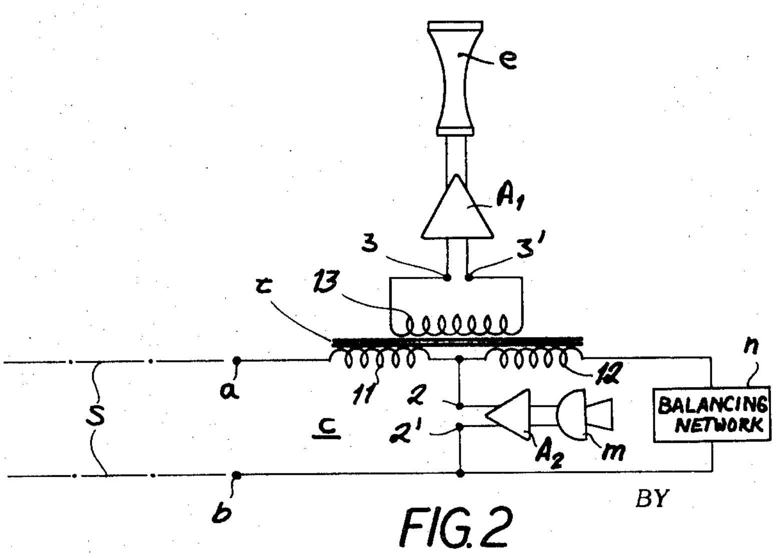
FIG. 2 is an overall circuit arrangement of a subscriber station including two amplifiers as shown in FIGS. 1A and 1B.

Reference will first be made to FIG. 2 which shows a subscriber station of a telephone system comprising an earpiece or speaker *e* and a mouthpiece or microphone *m* connected, by way of a hybrid coil transformer *b*, between a passive blanching network *n* and a two-wire subscriber line *s* leading to a central office not further illustrated. Transformer *t* includes two symmetrical windings inserted between network *n* and a terminal *a* of line *s*, i.e. a primary winding 11 and a balancing winding 12, as well as a secondary winding 13 connected across the receiver *e* by way of an amplifier $A_1$ whose input circuit includes a pair of line-side terminals 3, 3′. Transmitter *m* is connected, by way of an amplifier $A_2$, between the second line terminal *b* and the junction of windings 11 and 12, the output circuit of this amplifier including a pair of line-side terminals 2, 2′. Transformer *t* forms part of a coupling circuit *c* which connects the receiver *e* and the transmitter *m* in conjugate relationship across the line terminals *a*, *b* as is well understood in the art.

Figure 1A:
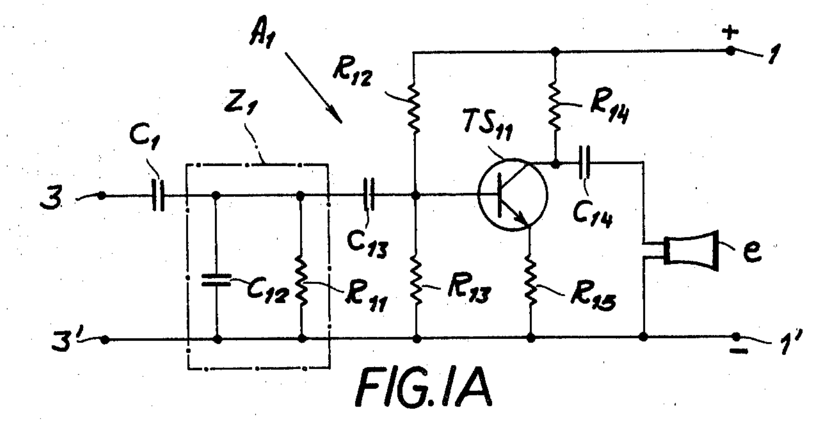
FIG. 1A is a circuit arrangement of an amplifier with reactive network adapted to be used in the receiving branch of a system according to our invention.

In accordance with our present invention, the input impedance of amplifier $A_1$ (as reflected into primary winding 11) and the output impedance of amplifier $A_2$ are strongly capacitive and substantially equal to each other, each of these impedances being also substantially equal to the characteristic impedance of subscriber line *s* developed across terminals *a* and *b* as seen from coupling circuit *c*. For this purpose, in accordance with a more specific feature of our invention, amplifier $A_1$ is provided with a passive reactive network $Z_1$ connected across its input terminals 3, 3′, amplifier $A_2$ being provided with a similar network $Z_2$ effectively connected across its output terminals 2, 2′. As shown in FIG. 1A, amplifier $A_1$ comprises an NPN transistor $TS_{11}$ with its collector connected through a resistor $R_{14}$ to positive potential on a terminal 1, its emitter connected through a resistor $R_{15}$ to negative potential on a terminal 1′, and its base tied to the junction of a voltage divider $R_{12}$, $R_{13}$ bridged across terminals 1, 1′. Network $Z_1$ consists, essentially of a condenser $C_{12}$ and a resistor $R_{11}$ connected in parallel across terminals 3, 3′, two coupling condensers $C_{11}$ and $C_{13}$ separating this network from terminal 3 and from the base of transistor $TS_{11}$, respectively. This transistor works into earpiece *e* by way of a further coupling condenser $C_{14}$.

Figure 1B:
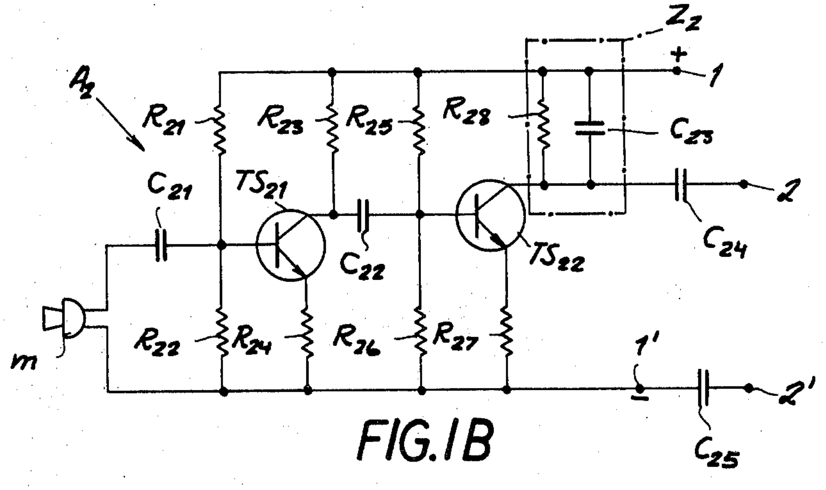
FIG. 1B is a circuit arrangement of an amplifier with reactive network adapted to be used in the transmitting branch of a system according to our invention.

As shown in FIG. 1B, amplifier $A_2$ comprises two NPN transistor stages $TS_{21}$ and $TS_{22}$ also connected across DC terminals 1 and 1'. Stage $TS_{21}$ has its base tied to the junction of a voltage divider $R_{21}$ and $R_{22}$ and further has a collector resistor $R_{23}$ and an emitter resistor $R_{24}$. Stage $TS_{22}$ is of similar design, with an input voltage divider $R_{25}$, $R_{26}$ an emitter resistor $R_{27}$ and a collector resistor $R_{28}$. Mouthpiece *m* works through a coupling condenser $C_{21}$ into the base-emitter circuit of stage $TS_{21}$ which energizes stage $TS_{22}$ through a coupling condenser $C_{22}$. Resistor $R_{28}$ forms part of the reactive network $Z_2$ which also includes a condenser $C_{23}$ in parallel therewith. Two further coupling condensers $C_{24}$ $C_{25}$ separate the output terminals 2 and 2' from network $Z_2$ and from negative terminal 1', respectively.

Since terminals 1 and 1' are interconnected through a low resistance direct current source, network $Z_2$ effectively bridges the output terminals 2, 2'. It should be recalled that the simple LC networks $Z_1$, $Z_2$ shown in FIGS. 1A and 1B may also be replaced by more sophisticated impedance combinations though the illustrated arrangement may be satisfactory for most purposes.

Figure 3:
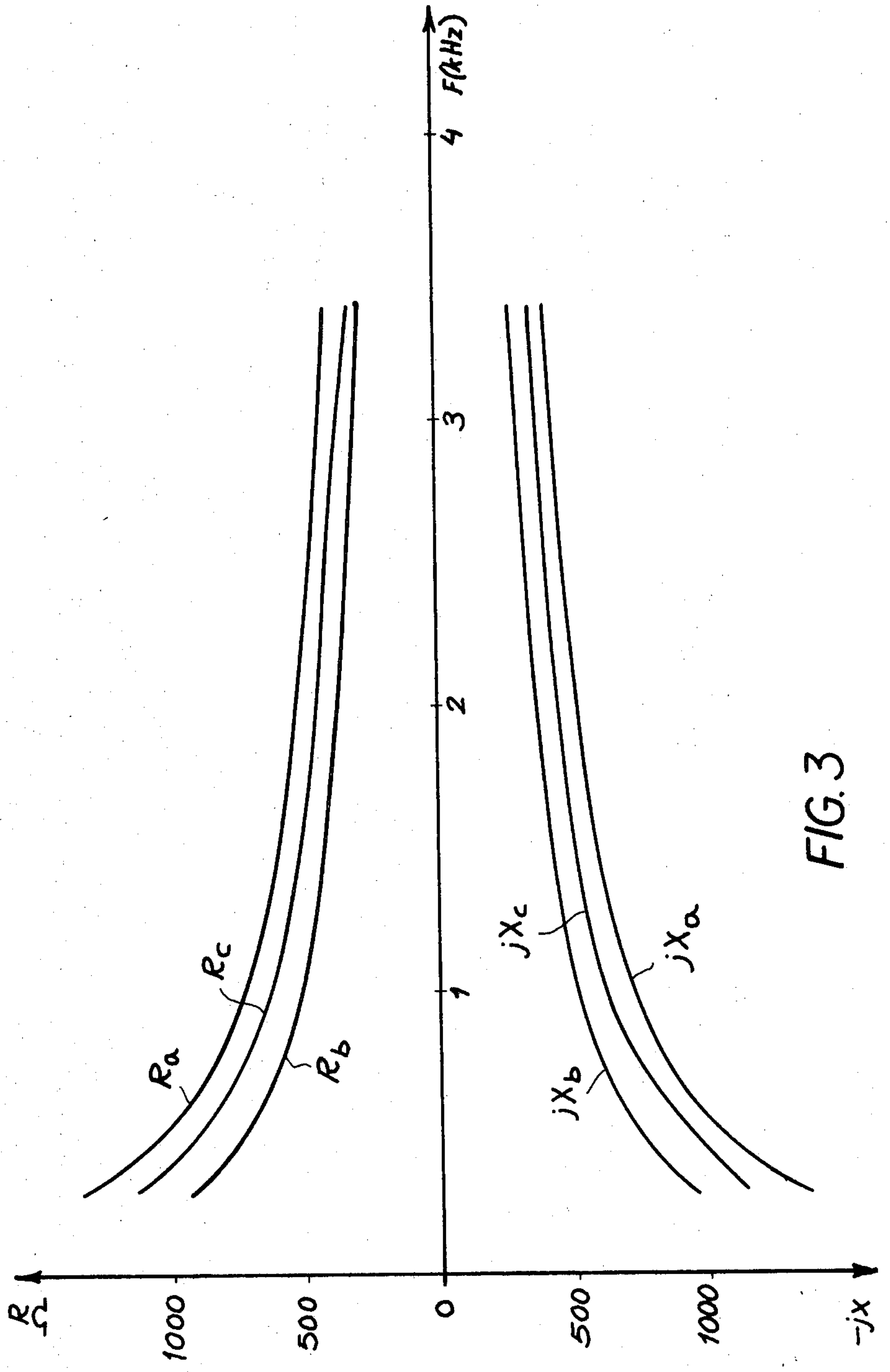
FIG. 3 is a set of graphs relating to the two amplifier system of FIG. 2.

In FIG. 3 we have shown at $R_a$ and at $jX_a$ the ohmic and reactive components of the characteristic impedances of line *s* over a voice frequency range between about 300 and 3,400 Hz. with conductors of this line assumed to be No. 26 wires of 0.4 mm. diameter. Curves $R_b$ and $jX_b$ represent the same components for a line with No. 22 conductors of 0.6 mm. diameter. Curves $R_c$ and $jX_c$ are the effective resistance and reactance of the coupling circuit *c* of FIG. 2 as seen from line *s*. It will be noted that the latter two curves lie substantially midway between the two first-mentioned pairs of curves, affording a nearly perfect impedance match throughout the illustrated band.

Figure 4:
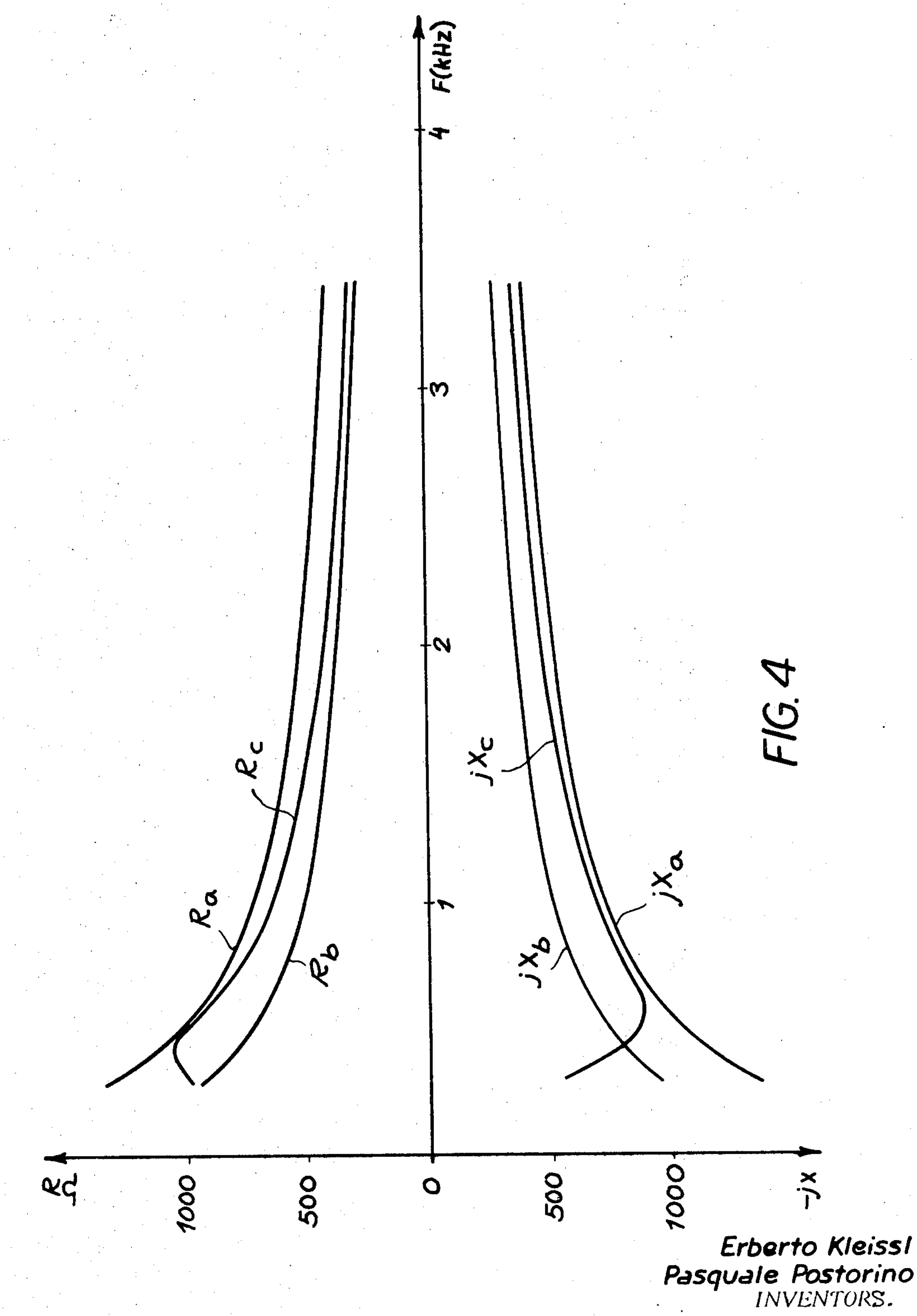
FIG. 4 is a set of graphs similar to FIG. 3 but relating to the system of FIG. 2 with its transmitting amplifier omitted.

FIG. 4 shows the same set of curves applied to the system of FIG. 2 with omission of amplifier $A_2$, the impedance of the transmitting branch being thus the output impedance of mouthpiece *m*. In this case, too, the latter impedance complements the effective input impedance of amplifier $A_1$ to substantially the characteristic impedance of line *s* over the major part of the voice frequency band.

Figure 5:
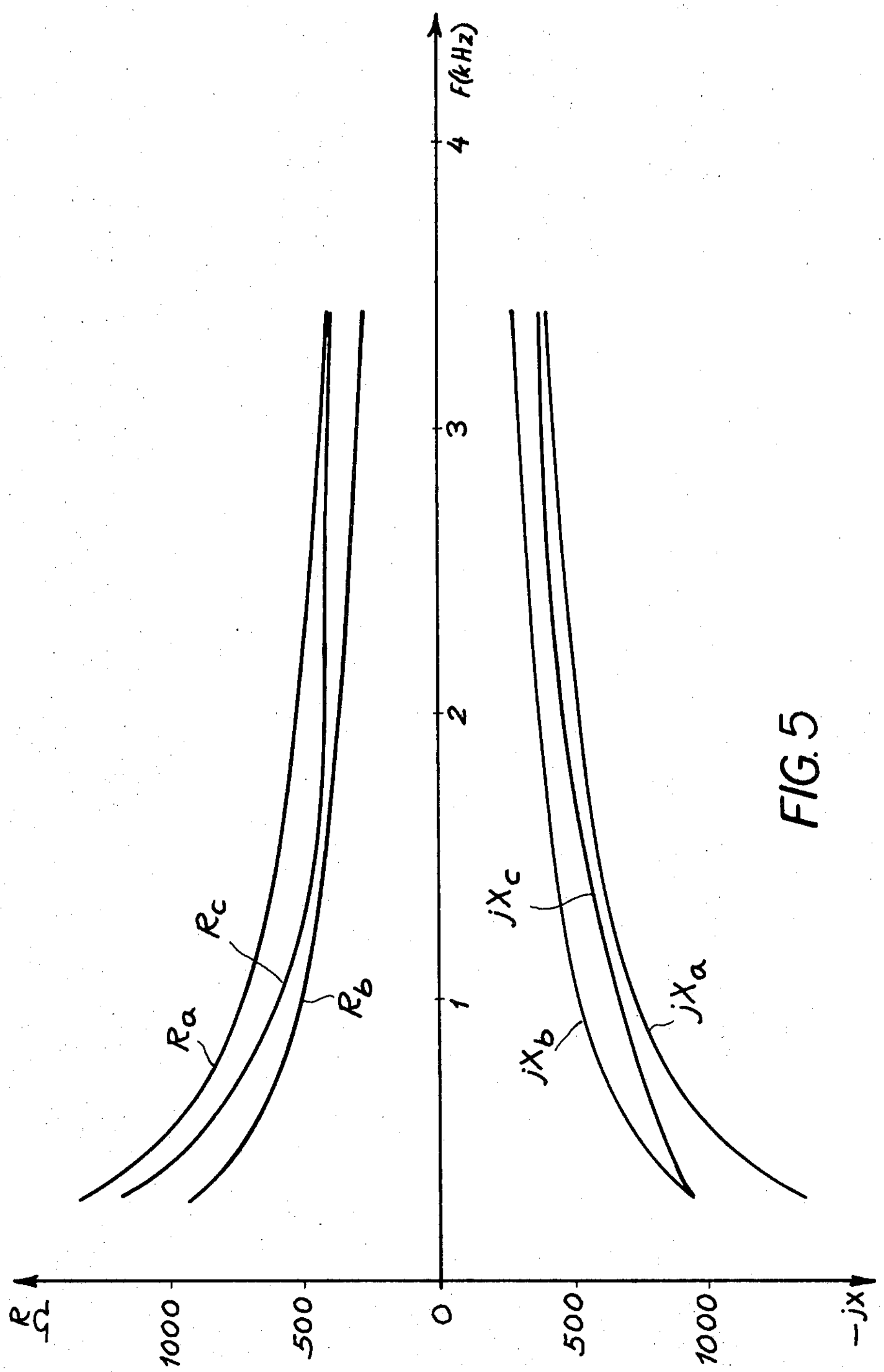
FIG. 5 is a set of graphs similar to FIG. 3 but relating to the system of FIG. 2 with its receiving amplifier omitted.

FIG. 5 shows the same curves applied to the reverse situation i.e. to the system of FIG. 2 with omission of amplifier $A_1$ so that the characteristic line impedance is matched by the output impedance of amplifier $A_2$ supplemented by the effective input impedance of earpiece *e*. There, again, a near-perfect match will observe for virtually the entire band.

The curves of FIGS. 3—5, obtained empirically, show a substantial identity of the absolute magnitudes of the resistive and reactive components of both the line impedance and the coupling impedance throughout the voice frequency band.

We claim:

1. In a telephone system comprising a two-wire line leading from a central office to a subscriber station provided with conjugate first and second branches respectively including a transmitting transducer and a receiving transducer for a band of voice frequencies, and a coupling circuit including a hybrid coil with a primary winding common to said branches connected to one line wire, a balancing winding in said first branch and a secondary winding connected across said second branch, the combination therewith of amplifier means including an amplifier inserted in at least one of said branches between said transducer thereof and said coupling circuit, said amplifier being provided with a reactive network making the sum of the effective impedances of said branches as seen from said line substantially equal to the characteristic impedance of said line throughout said band.

2. The combination defined in claim 1 wherein said amplifier has a pair of line-side terminals shunted by said reactive network, the latter being predominantly capacitive.

3. The combination defined in claim 2 wherein said reactive network includes a resistor and a capacitor connected in parallel across said terminals.

4. The combination defined in claim 3 further including a series condenser between at least one of said terminals and said network.

5. The combination defined in claim 2 wherein said amplifier is inserted in said first branch, said terminals being respectively tied to the junction of said primary and balancing windings and to the other line wire.

6. The combination defined in claim 2 wherein said amplifier is inserted in said second branch, said terminals being tied to opposite ends of said secondary winding.

7. The combination defined in claim 1 wherein said amplifier means includes another amplifier inserted in the other of said branches between the transducer thereof and said coupling circuit, said other amplifier being provided with a separate reactive network complementing the first-mentioned reactive network to make said sum of said effective impedances substantially equal to said characteristic impedance.

8. The combination defined in claim 7 wherein the effective impedances of both said amplifiers as seen from said line are substantially equal and correspond each to substantially half said characteristic impedance.

9. The combination defined in claim 1 wherein said coupling circuit further includes a passive balancing network connected between said balancing winding and the other line wire.

10. The combination defined in claim 1 wherein said effective impedances have resistive and reactive components of substantially the same absolute magnitudes throughout at least the major part of said band of voice frequencies.